(12) United States Patent
Mohr et al.

(10) Patent No.: US 7,918,720 B2
(45) Date of Patent: Apr. 5, 2011

(54) EXTENSION ATTACHMENT FOR A BULK MATERIAL CONTAINER

(76) Inventors: Jan-Hendrik Mohr, Beeien (DE); Ulrich Claes, Dissen (DE); Christopher Vieregge, Dorentrup (DE)

(*) Notice: Subject to any disclaimer, the term of this patent is extended or adjusted under 35 U.S.C. 154(b) by 254 days.

(21) Appl. No.: 12/016,301

(22) Filed: Jan. 18, 2008

(65) Prior Publication Data

US 2008/0265601 A1 Oct. 30, 2008

(30) Foreign Application Priority Data

Jan. 18, 2007 (DE) .......................... 10 2007 003 653

(51) Int. Cl.
*A01D 90/10* (2006.01)
(52) U.S. Cl. .......................................... 460/23; 460/119

(58) Field of Classification Search ................... 296/15; 460/23, 119
See application file for complete search history.

(56) References Cited

U.S. PATENT DOCUMENTS 6,074,298 A 6/2000 Majkrzak et al.
6,206,779 B1 * 3/2001 Gerber et al. .................. 460/23

FOREIGN PATENT DOCUMENTS

EP 1564157 * 8/2005

* cited by examiner

*Primary Examiner* — Joseph D Pape
(74) *Attorney, Agent, or Firm* — Christine Johnson; Johnson & Scaturro, LLC

(57) ABSTRACT

To increase the capacity of an extension attachment for a bulk material container comprising a frame (32) and a plurality of flaps (33, 34) linked to the frame (32), which are capable of swivelling and, in a swivelled-out position, surround an internal space (31) of the extension attachment, the internal surface (28) facing the internal space (31) of at least of one of the flaps (33) has a concave shape in the swivelled-out position.

10 Claims, 3 Drawing Sheets

EXTENSION ATTACHMENT FOR A BULK MATERIAL CONTAINER

CROSS REFERENCE TO RELATED APPLICATIONS

This application claims benefit of priority to earlier filed German Patent Application 10 2007 003 653.3 filed in the German Patent Office on Jan. 18, 2007.

FIELD OF THE INVENTION

The invention relates to an extension attachment for increasing the capacity of a bulk material container. In particular, it relates to a grain tank attachment for a combine harvester.

BACKGROUND OF THE INVENTION

A grain tank of a combine harvester is frequently provided with an extension attachment that comprises several flaps pivotally linked to a frame to allow swiveling. Such a grain tank attachment is, for example, known from DE 10 2004 007 673 A1. When a combine harvester is travelling on the road, the flaps are swivelled inwards and lie flat on the opening of the grain tank so that the overall height of the combine harvester that is permissible on road traffic is not exceeded. During operation in the field, the flaps are in the swivelled-out position, in which they extend obliquely outwards and upwards from the frame. In this manner, they increase the volume of the grain tank, so that said tank can be emptied at longer intervals.

In order to make the intervals between two emptying sequences as large as possible, it seems desirable at first sight to provide an attachment with flaps which are as large and as widely spread as possible. By doing so, however, the problem arises that the width of the flaps, i.e., their dimension transversely to the swivel axis, is limited by the width of the grain-tank opening, above which they must be laid one on top of the other in the closed position. Moreover, the centre of gravity of the combine harvester is increasingly shifted upwards when the extension attachment is filled with grain in the course of a harvesting process, so that the combine harvester's stability on sloped ground decreases. An extension attachment that extends too far up beyond the grain tank therefore impairs the operational safety of the combine harvester.

SUMMARY OF THE INVENTION

Indeed, it would be possible to reduce the design height of an extension attachment, in a swivelled out state, by reducing the inclination of the flaps in the swivelled-out position, however, this would apparently occur at the expense of the carrying capacity.

The object of the present invention is therefore to provide a collapsible extension attachment for a bulk material container, which combines a low design height with a large carrying capacity.

This object is met according to the invention, in that an extension attachment for a bulk material container has a frame and a plurality of swivel-capable flaps, hinged on said frame, limiting a container extension volume, and in a swivelled-out position, the internal surface facing the container extension volume of at least one of the flaps has a concave shape. The concavity provides volumetric enlargement in comparison with a conventional extension attachment with straight and flat flaps in cross-section, without the dimensions of the extension attachment in the horizontal and vertical directions in the swivelled out condition having to be increased.

The inclination of the internal surface of the flap in the swivelled-out position can be locally smaller than the angle of repose of the bulk material for which the container is provided. A particularly large volumetric increase is achievable when the internal surface of the flap is aligned locally horizontally in the swivelled-out position.

In order to implement the concave shape on the one hand, in the swivelled-out state, and to be able to swivel in the flaps in a space-saving manner, it is appropriate for the flap to comprise segments that can be connected in a swivel-capable manner with one another.

In particular, when the internal surface inclination of the flap is locally smaller than the angle of repose, then it is appropriate to provide auxiliary means that allow elimination of the bulk material from the flap of the bulk material container when the bulk material container is emptied. In the simplest case, it can involve conventional rotary actuators for the flap, which are powerful enough to swivel the flap inwards even if it is loaded with bulk material, so that said bulk material can slide inwards into the bulk material container.

Another suitable auxiliary means can be a flexible membrane that is movable between a position that is adjacent to the internal surface of the flap and a raised position. By moving the membrane, if necessary repeatedly, the bulk material on it can be set in motion so that it slides into the bulk material container.

The motion can be driven by a pulling means acting on the membrane, e.g. for tensioning the membrane. Alternatively, an interstice between the membrane and the internal surface of the flap can be exposed to pressurised gas in order for to raise the membrane off the flap.

Furthermore, means for fluidizing the bulk material can be provided on the flap. As means for fluidization, for example, vibrators or knockers can be used; particularly, they can be driven pneumatically or electrically.

According to a preferred embodiment, outlet openings for a pressurised gas are distributed on the internal surface of the flap. These outlet openings can entail a means of fluidization, or they can serve to pressurise the interstice between the flap and the membrane with gas. When a membrane is used, outlet openings for pressurised gas can be provided also in the membrane itself.

As a further auxiliary means for eliminating the bulk material from the flap, at least one plate can be provided on the internal surface, which can be swivelled separately from the flap.

DESCRIPTION OF THE DRAWING FIGURES

Further features and advantages of the invention ensue from the following description of exemplary embodiments with reference to the figures, as follows.

DETAILED DESCRIPTION OF THE INVENTION

Figure 1:
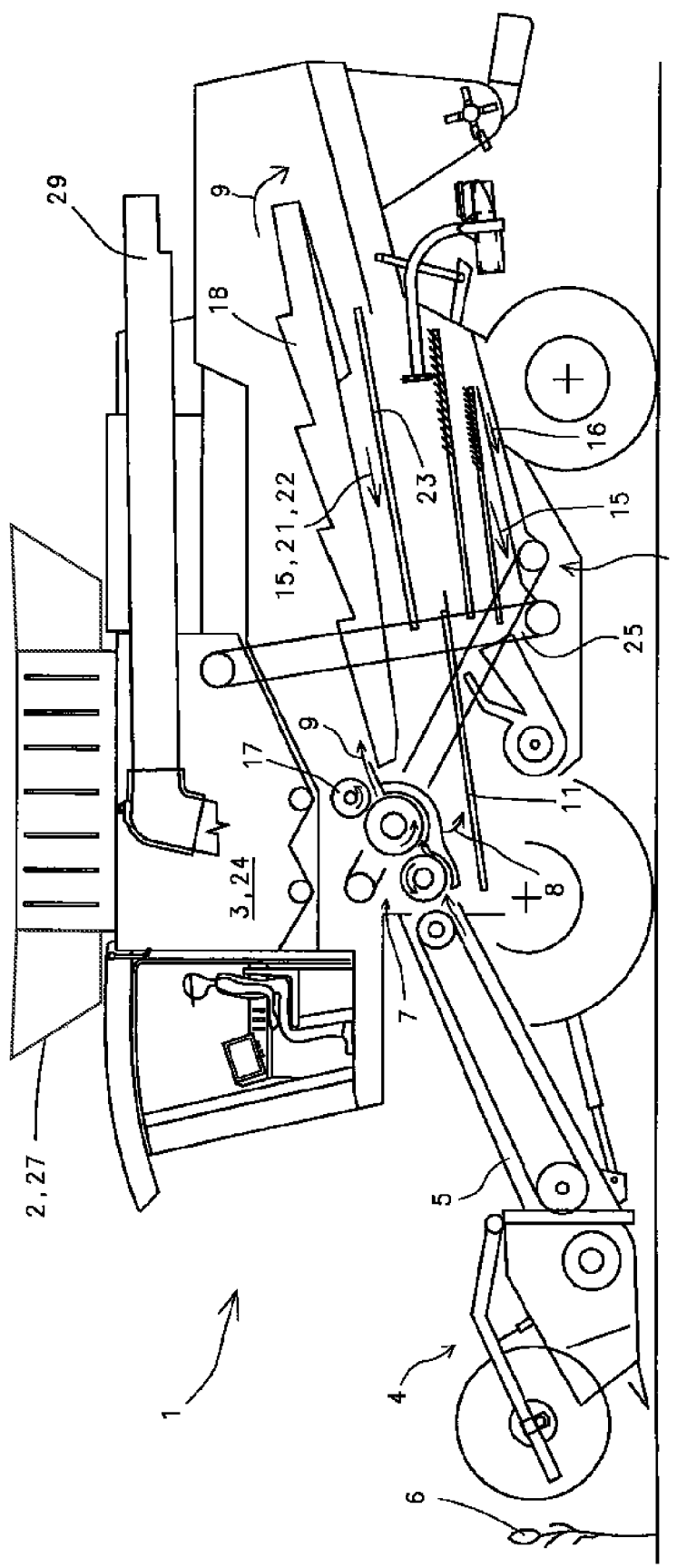
FIG. 1 shows a combine harvester with an attachment for enlarging the volume of its grain tank according to the invention.

In FIG. 1, a schematic longitudinal section through a combine harvester 1 is depicted with an attachment 2 for enlarging the volume of a grain tank 3 according to the invention. The combine harvester is equipped with a cutting system 4 at the front, which is located near an inclined conveyor 5. With the cutting system 4, the combine harvester 1 takes the harvested plant 6 and feeds it to the inclined conveyor 5. The inclined conveyor 5 transfers the harvested plant 6 to an upstream threshing system 7. The threshing system 7 pre-pares the harvested plant 6, wherein it is divided into a grain-chaff-mixture 8 and a product flow 9 comprising threshed stem. The grain-chaff mixture 8 is conveyed via a preparation rack 11 directly to a cleaning device 13, which separates the grains 15 from non-grain components 16, i.e. from stem and chaff parts.

Behind the threshing system 7, a turning drum 17 rotating in anti-clockwise direction is located, which conveys the product flow 9 comprising threshed stems onto a straw rack 18. The straw rack 18 separates the grains 15 still inside the product flow 9, short straw 21 and chaff 22, which also reach the cleaning device 13 via a return-motion rack. The grains 15 separated by the cleaning device 13 are fed by a grain elevator 25 into a container 24 on the combine harvester, the so-called grain tank 3. When necessary, the grains 15 are reloaded with a grain-tank emptying conveyor 29 from the grain tank 3 to a transport vehicle (not depicted).

To minimise the frequency with which such reloading processes become necessary, the extension attachment 2 according to the invention is located on the upper side of the grain tank 3 in the form of a grain tank top attachment 27. The grain tank top attachment 27 is depicted in a swivelled-out position in which it enlarges the volume of the grain tank 3.

Figure 2:
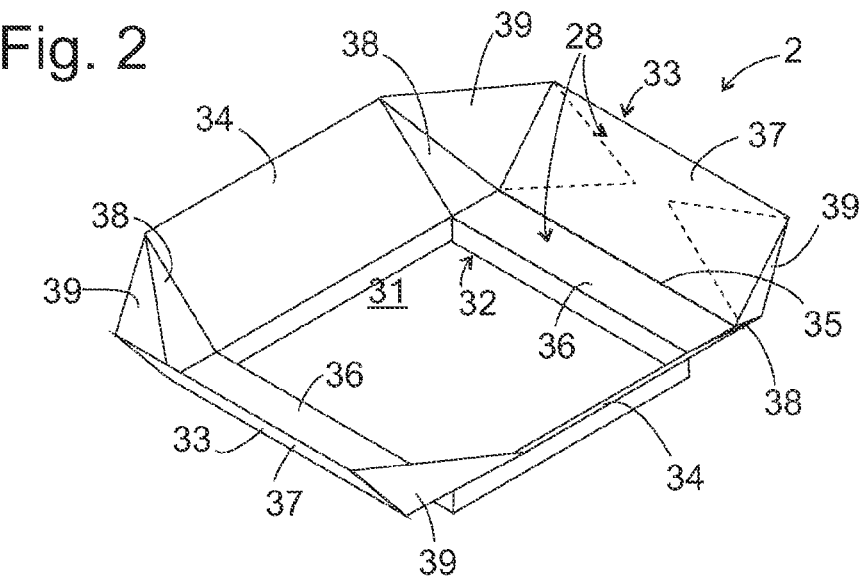
FIG. 2 shows a perspective view of the extension attachment according to a first embodiment of the invention, in a swivelled-out position.

FIG. 2 shows a perspective view of a first embodiment of the extension attachment 2 according to the invention. A rectangular frame 32 comprising four vertical walls of the extension attachment can be an integral component of the grain tank 3 or can be attached on a top edge of the grain tank 3 and be fixed on it, i.e., an internal space 31 surrounded by the extension attachment 2 in lateral direction is open upwards and joins the grain tank 3 at the bottom—not depicted in FIG. 2.

At the top edge of each of the four walls of the frame 32 a flap 33, 33, 34, 34 is pivotally mounted. The flaps 34 are single-pieced, plane, rectangular or trapezoidal plates. The flaps 33 respectively consist of two segments connected pivotally with one another along a line 35, namely an inner segment 36 which is approximately horizontal in the swivelled-out position, and an outer segment 37. Since the two segments 36, 37 form an obtuse angle in cross-section on the line 35, a concave internal surface 28 (see also FIG. 5) of the flap 33 is achieved, through which the carrying capacity of the extension attachment 2 is made greater than the one of a conventional extension attachment with single-part, plane flaps.

Four triangular plates 38 are respectively connected pivotally with one of the inner segments 36 and one of the flaps 34 by means of hinges. Further triangular plates 39 are respectively connected through a hinge with one of the outer segments 37 and have an edge that touches the adjacent plate 38. To make the contact area between the plates 38, 39 grain tight, the plates 39 on their edge touching the plate 38 can be provided with a flexible lip, for example made of rubber that lies on the plate 38.

Figure 5:
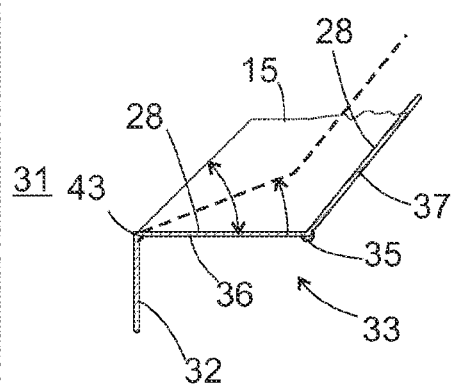
FIG. 5 shows a schematic half-section through the extension attachment that illustrates the principle of operation of the attachment.

The flaps 34 have an inclination that is greater than the grain angle of repose, so that when the grain tank is emptied and the grain thereby drops from the extension attachment 2 through the opening of the frame 32 into the grain tank 3, practically no grain remains on the flaps 34. However, a substantial amount of grain remains on the essentially horizontal inner segments 36 of the flaps 33. In order to move this rest grain into the grain tank 3, too, the flaps 33, as outlined by a dashed line in the schematic section of FIG. 5, are swivelled upwards and inwards about their inner edge 43 that joins them with the frame 32. As soon as the slope of the flap segments 36, 37 is greater than the angle of repose of the grain 15 still remaining on the flap 33, the grain 15 slides completely into the grain tank.

To prevent grain leaking sideways, the swivel motion of its two segments 36, 37 relative to one another and of the plates 39 against the outer segment 37 should be coordinated with the upwards swivel motion of the entire flap 33, so that the lower edge of the plate 39 remains in contact with the plate 38. This motion can make it necessary that the flaps 34 are swivelled beyond the position shown in FIG. 2, so that when their slope is smaller than the angle of repose, the grain that drops from the flaps 33 or from the triangular plates 38, 39 remain on them. To get rid of this grain completely, it can become necessary for the flaps 33, 34 to be swung back and forth several times.

When the flaps 33, 34 are again free of grain and the combine harvester should again be made ready for road traffic, the plates 39 are swung against the outer segments 37, as depicted by the dashed lines in FIG. 2. From the configuration resulting there from, the extension attachment 2 can be folded with the motion sequence disclosed in DE 10 2004 007 673 A1 (wherein the four plate-shaped attachment parts correspond to the flaps 34 described in this specification and the inner segments 36), so that the flaps 33, 34 come to rest spread flat and overlapping the frame 32 opening.

Figure 3:
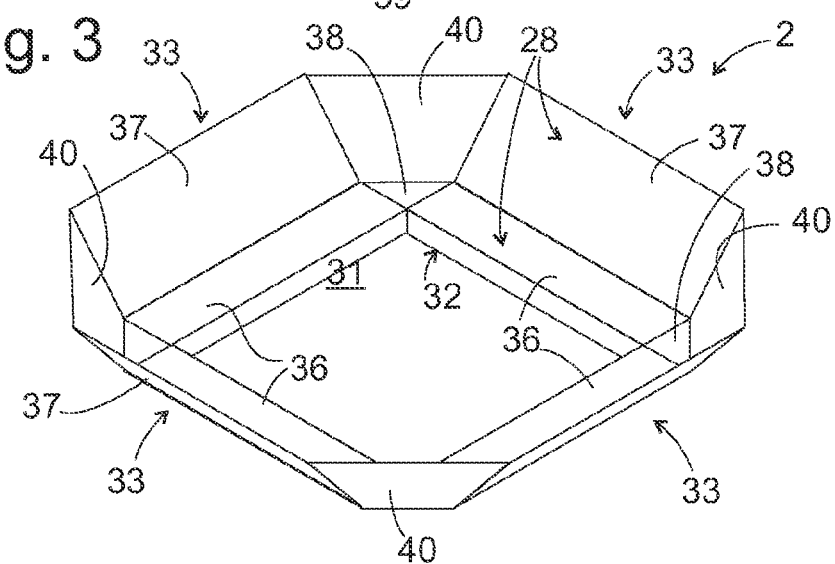
FIG. 3 shows a perspective view of an extension attachment according to a second embodiment, in a swivelled-out position.

A second embodiment of the extension attachment according to the invention with four concave flaps 33 in a swivelled-out state is shown in FIG. 3. The triangular plates 38 located at the corners of frame 32 are connected by means of hinges on two of their edges with inner segments 36 of the two respective neighbouring flaps 33. Trapezoidal plates 40 respectively have an edge hinged with an outer segment 37, and two edges that touch in a grain-tight manner one of the triangular plates 38 and an adjoining outer segment 37, respectively.

Figure 4:
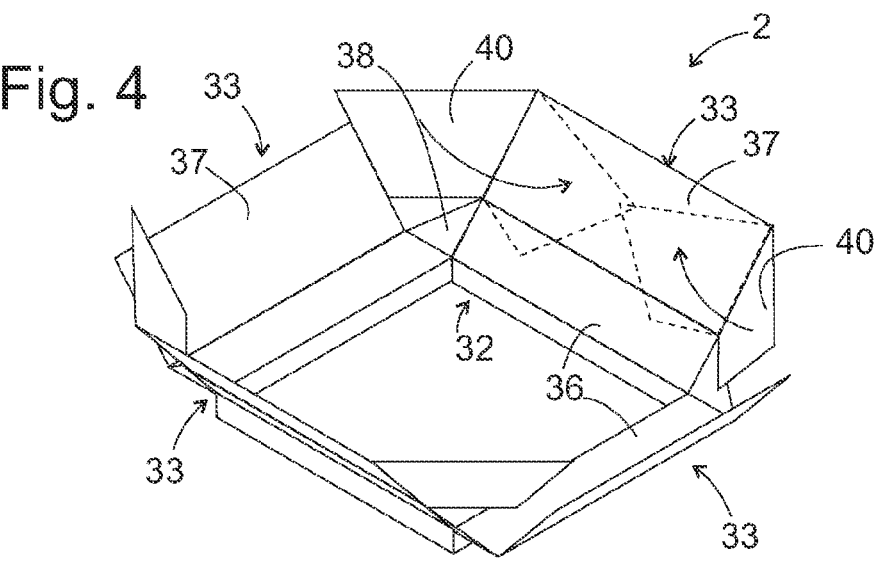
FIG. 4 shows a perspective view of the extension attachment from FIG. 3, in a partially swivelled-in position.

This extension attachment 2 is foldable via an intermediate stage depicted in FIG. 4. Two inner segments 36 opposite one another are swivelled upwards about their edge that is linked to the frame 32 and inwards to a position which is coplanar to the outer segment 37 of the same flap 33. In this position, the trapezoidal plates 40 linked to the outer segments 37 are swivelled into a position outlined with dashed lines, in which they lie flat on the flaps 33 carrying them. When these flaps 33 are swivelled flat above the opening of the frame 32, also the two other flaps 33 can be folded above the frame opening and be laid flat on top.

To be able to free the flaps 33 of the extension attachment 2 quickly from the grain when emptying the grain tank 3, diverse types of auxiliary means can be provided, of which some are explained in the following passage based on FIGS. 6 to 10. Like FIG. 5, each of these figures shows a half-section through the extension attachment 2 along a vertical cutting plane.

Figure 6:
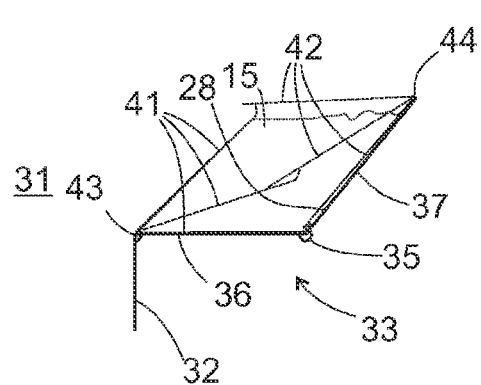
FIG. 6 shows a half-section analogous to FIG. 5, which shows a first variant of the means for removing bulk material from an extension attachment flap.

According to the embodiment of FIG. 6, auxiliary plates 41, 42 are provided which lie flat on the segments 36, 37 of the flaps 33, and of which the plate 41 can be swivelled about the inner edge 43 of the flap and the other plate 42 about its outer edge 44. The auxiliary plates 41, 42 overlap slightly along the line 35. When the lower auxiliary plate 41 is swivelled upwards, as shown in the figure, by means of dashed lines, it takes the outer plate 42 with it, and an amount of grain 15 remaining on the flap 33 when emptying the tank 3 starts to slide towards the tank 3. Since the swivel motion of the auxiliary plates 41, 42, is repeated several times if necessary, the grain 15 can be eliminated from the flap 33.

Figure 7:
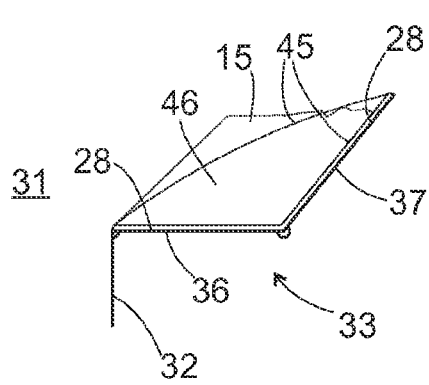
FIG. 7 shows a schematic half-section that shows a second variant of the means for removing bulk material from the flap.

An effect that is similar to that of the auxiliary plates 41 may be attained with the help of a flexible membrane 45, which, as shown in FIG. 7, is fixed along the edges 43, 44 on the flap 33 and lies loosely between the edges, so that a normally closed interstice 46 between it and the flap 35 may be exposed to pressurised air. If through compressed air supply to the interstice 46 the membrane 45 is lifted from the flap 33, the grain 15 resting on the membrane 45 starts to slide and drops into the grain tank 3.

The membrane can be implemented in the form of a hose, of which one side is fastened, e.g., by adhesion, on the internal surface of the flap and another side can be lifted off the internal surface by supplying compressed air to it.

Figure 8:
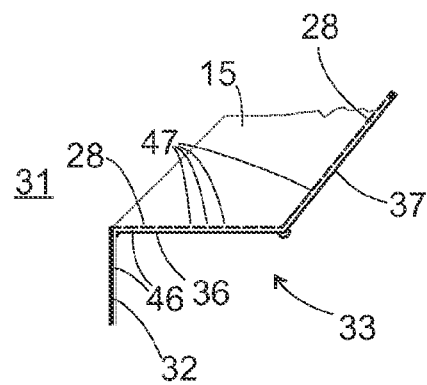
FIG. 8 shows a half-section that shows a third variant of this means.

In the embodiment of FIG. 8, compressed air lines 47 are routed through the flaps 33, which discharge to outlet openings 48 on the inner side of the flaps 33. Since compressed air is blown into the grain 15 resting on the flaps 33 through these openings 48, the grain 15 is fluidized and flows reliably into the grain tank, even with minimum slope of the segment 36. The concepts of FIGS. 7 and 8 can be combined in that compressed air outlet openings are formed in the membrane 45, to fluidize the grain that remains stuck on the membrane.

Figure 9:
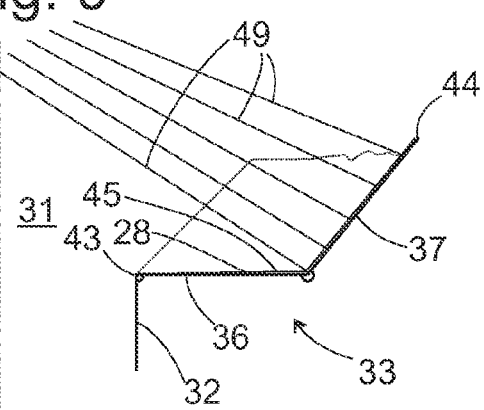
FIG. 9 shows a half-section that shows a fourth variant of this means.

In the variant of FIG. 9, also the internal surface of the flap 33 is covered with a flexible membrane 45 fixed at the edges 43, 44. Instead of using compressed air, this membrane 45 can be lifted by means of pulling ropes 49 acting at different points of the internal surface of the flap 33. When the pulling ropes 49 are successively tightened progressively from outside or from the top inwards or downwards, it is possible to free the flap 33 completely from grain, in one single passage.

Figure 10:
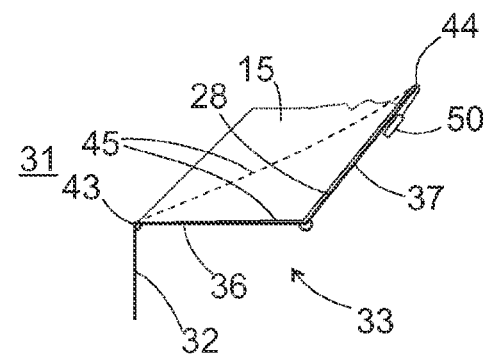
FIG. 10 shows a half-section that shows a fifth variant of this means.

In addition, the embodiment of FIG. 10 uses a membrane 45 lying on the internal surface of the flap 33 and fixed on the inner edge 43 of the flap. A pulling device 50 acts on an outer top edge of the membrane 45. When the pulling device 50 tightens the membrane 45, it assumes the shape depicted as dashes in FIG. 10, so that the grain 15 lying on the flap 33 slides into the tank 3.

The invention claimed is:

1. An extension attachment for a bulk material container comprising:
    a rectangular frame including a plurality of vertical walls defining an inner container space, at least one vertical wall including a flap mounted to a corresponding vertical wall top edge, the flap comprising:
        a first flap segment having first and second ends, the first end pivotally mounted at a segment end to the corresponding vertical wall top edge;
        a second flap segment pivotally coupled to the second end of the first flap segment;
        the first and second flap segments pivotable with respect to each other to define a concavity in the flap, the concavity increasing the bulk material capacity of the extension attachment without increasing the flap height.

2. The extension attachment according to claim 1 wherein the first segment is pivotable with respect to the top edge to define an incline with respect to the top edge, the incline smaller than an angle of repose of the bulk material in the inner container space.

3. The extension attachment according to claim 1, characterised in that the first flap segment (33) is pivotable with respect to the corresponding vertical wall so as to be horizontally aligned with an opening of the inner container space.

4. The extension attachment according to claim 1, wherein the first and second segments are pivotable with respect to each other to form an obtuse angle with respect to a plane of the inner container space.

5. The extension attachment according to claim 1, characterised in that an interior surface portion of at least one flap segment includes a flexible membrane movable with respect to the internal surface portion so as to facilitate movement of bulk material along said flap into said bulk material container.

6. The extension attachment according to claim 5, including a pulling means coupled to the membrane to enable movement of the membrane with respect to the internal surface of the flap.

7. The extension attachment according to claim 5 including an interstice between the internal surface of the flap and the membrane adapted to be pressurized with gas.

8. The extension attachment according to claim 5, wherein said flap includes means for fluidizing the bulk material.

9. The extension attachment according to claim 5 wherein said flap internal surface includes outlet openings for distributing a pressurized gas.

10. The extension attachment according to claim 5 wherein said flap includes a plate pivotally attached to the flap on an internal flap surface.

* * * * *